United States Patent Office 3,293,328
Patented Dec. 20, 1966

3,293,328
ACYLSULFAMOYLPHENYL PHOSPHATES AND METHOD OF PREPARING THE SAME
Gerald Berkelhammer, Ewing Township, Mercer County, and Frank Albert Wagner, Jr., Belle Mead, N.J., assignors to American Cyanamid Company, Stamford, Conn., a corporation of Maine
No Drawing. Filed May 28, 1963, Ser. No. 283,718
7 Claims. (Cl. 260—944)

This invention relates to new organic compounds. More particularly, it relates to a new class of sulfamoylphenyl phosphates and to a unique process for the preparation thereof.

The novel compounds of the present invention can be illustrated by the following formula:

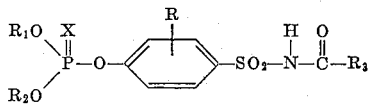

wherein $R_1$ and $R_2$ are lower alkyl radicals, X is a sulfur or oxygen atom, R is hydrogen, halogen or a lower alkyl radical and $R_3$ is lower alkyl, halo(lower)alkyl or an aryl radical. The term lower alkyl used above is intended to cover alkyl groups having one to four carbon atoms.

The compounds of the present invention are, in general, solids having a definite melting point. They are somewhat soluble in water.

The new compounds of the present invention may be prepared by reacting, in a strongly alkaline medium, an appropriate phosphorochloridothioate or phosphorochloridate such as O,O-dimethyl or O,O-diethylphosphorochloridothioate with an N-acyl phenolsulfonamide, such as, for example, N-benzoyl-1-phenol-4-sulfonamide. The reaction is carried out at about between 0° C. and 100° C., preferably in the presence of a polar solvent such as water, methyl ethyl ketone, ethanol or the like.

The following are among the compounds contemplated by this invention:

O,O-dimethyl O-4-(benzoylsulfamoyl)phenyl phosphorothioate;
O,O-diethyl O-4-(benzoylsulfamoyl)phenyl phosphorothioate;
O,O-dimethyl O-4-(acetylsulfamoyl)phenyl phosphorothioate;
O,O-diethyl O-4-(acetylsulfamoyl)phenyl phosphorothioate;
Dimethyl 4-(benzoylsulfamoyl)phenyl phosphate;
Diethyl 4-(benzoylsulfamoyl)phenyl phosphate;
Dimethyl 4-(acetylsulfamoyl)phenyl phosphate;
Diethyl 4-(acetylsulfamoyl)phenyl phosphate;
O,O-dimethyl O-4-(pentanoylsulfamoyl)-3-methylphenyl phosphorothioate;
Dimethyl 4-(propionylsulfamoyl)-3-chlorophenyl phosphorothioate;
Diethyl 4-(isobutyrylsulfamoyl)-3-chlorophenyl phosphate;
Dimethyl 4-(butyrylsulfamoyl)-3-methylphenyl phosphate;
Diethyl 4-(benzoylsulfamoyl)-3-chlorophenyl phosphate;
O,O-diethyl O-4-(benzoylsulfamoyl)-3-methylphenyl phosphorothioate;
O,O-dimethyl O-4-(chloroacetylsulfamoyl)phenyl phosphorothioate; and
Diethyl 4-(dichloroacetylsulfamoyl)phenyl phosphate.

Although certain sulfamoylphenyl esters of organic phosphorothioates have been described in the prior art, the N-acyl sulfamoylphenyl phosphates of the subject invention are believed to be unknown. Furthermore, in early attempts to prepare the compounds of the subject invention, applicants encountered extreme difficulty in obtaining product in high yield. It was found that adjusting the pH of the reaction mixture to a value between about 9.5 and 12 and maintaining this pH during the reaction period was highly desirable in producing compounds of high purity in good yield. Under the preferred conditions, yields amount to from 35% to 70% are obtained, or from 3½ to 7 times the yields obtainable when the reaction is conducted at pH values of about 8 or below.

The compounds of the instant invention are useful as general insecticides and systemic insecticides in warm-blooded animals. When employed as animal systemics, the compounds may be administered orally as in the feed or in capsule, tablet or pill form. When used as general insecticides, they may be added in an amount of from 0.01% to about 5% to a finely divided carrier such as talc, attapulgite or other material, with or without the addition of a surface acting agent or wetting agent and applied as a dust or wettable powder or they may be applied in liquid media as solutions or emulsions and sprayed directly upon vegetation.

The effectiveness of the compounds of the instant invention as systemic insecticides in warm-blooded animals is demonstrated by the following tests in which mosquitoes were used as the test arthropod. Aedes aegypti mosquitoes were raised in an insectary by conventional methods and the females were selected. They were placed in appropriate containers which were held against the shaved skin of mice in such manner that the mosquitoes were permitted to feed ad libitum upon the mouse. In the tests the mice had been fed a variety of compounds at various

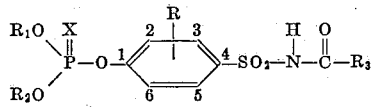

| Compound | | X | $R_3$ | R | Approximate Oral $ED_{50}$ Mouse-Aedes mg./kg. | Approximate Oral $LD_{50}$ Mouse mg./kg. | C.I. $LD_{50}/ED_{50}$ |
|---|---|---|---|---|---|---|---|
| $R_1$ | $R_2$ | | | | | | |
| $CH_3$ | $CH_3$ | S | $CH_3$ | H | 0.4 | >100 | >250 |
| $CH_3$ | $CH_3$ | S | —⟨ ⟩ | H | 12.5 | >100 | >8 |
| $CH_3$ | $CH_3$ | S | $CH_3$ | 3-$CH_3$ | 0.75 | >1,000 | >1,330 |
| $CH_3$ | $CH_3$ | S | i-$C_3H_7$ | H | <1 | >100 | >100 | dosage levels prior to permitting the mosquitoes to feed on them. Observations were made on the mosquitoes for 72 hours after being allowed to feed upon the treated mice. The dosage of the insecticides in milligrams per kilogram of body weight in the mouse, necessary to kill half of the mosquitoes feeding upon the mice, was determined and is set forth in the table below under column $ED_{50}$. Also, the dosage of the insecticide in the mice which resulted in death of half of the mice was observed and is indicated in the table above.

The insecticidal activity of the compounds of the instant invention is demonstrated by the following tests wherein the compounds of Example 2, O,O-dimethyl O-4-(acetylsulfamoyl)phenyl phosphorothioate, was made up as 0.1% and 0.01% solutions in a 65% acetone-35% water mixture. These solutions were applied to potted nasturtium plants, two-inches tall, which were infested with *Aphis rumicis* L. (Aphids) two days before testing. The sprayed plants were laid on their side on white enamel trays which had the edges coated with oil as a barrier. Mortality estimates were made two days following treatment. At 0.1% concentration, 100% kill was effected and at 0.01%, 80% kill was recorded.

In a standard test for effectiveness against the *Prodenia eridania* Cram. (Southern Armyworm), a 0.1% solution of O,O-dimethyl O-4-(acetylsulfamoyl)phenyl phosphorothioate in a 65% acetone-35% water mixture was found to be effective. Sieva lima bean leaves were dipped in the test solution and permitted to dry. When dry, they were placed in petri dishes which had moistened filter paper in the bottom and ten-instar, armyworm larvae added to each dish. The dishes were covered and held at 80° F., 60% relative humidity. After two days, mortality counts were made. Sixty percent kill was recorded.

In a further test, O,O-dimethyl O-4-(acetylsulfamoyl)phenyl phosphorothioate in a 1.0% concentration in dust was sprinkled evenly over the bottom of seven-inch plates. Twenty adult male *Blattella germanica* L. (German cockroach) were placed on the dusted dishes and covered with screening. Water was supplied in two-ounce bottles with a cotton wick. Mortality counts were made after holding for three days at 80° F., and 60% relative humidity. In these tests, 65% kill was recorded.

The following examples will further illustrate the invention.

*Example 1.—Preparation of O,O-dimethyl O-4-(benzoylsulfamoyl)phenyl phosphorothioate*

To a solution of 2.7 g. (0.01 mole) of N-benzoyl-1-phenol-4-sulfonamide (U.S. Patent 2,694,720) in 20 ml. (0.01 mole) of 0.5 N sodium hydroxide is added dropwise 1.56 g. (0.01 mole) of O,O-dimethylphosphorochloridothioate. 22 ml. of N sodium hydroxide is added to the mixture over the next 45 minutes to keep the pH slightly above 8. A solid forms which is filtered off. Its infrared spectrum indicated that it is a salt of the desired product. The solid is dissolved in water and acidification gives another solid. This solid is precipitated from chloroform with hexane and from toluene with hexane to give 232 mg. (6%) of a solid melting at 101°–102° C.

From this example it can be seen that at low alkaline pH only 6% yield of product is obtainable.

*Example 2.—Preparation of O,O-dimethyl O-4-(acetylsulfamoyl)phenyl phosphorothioate*

To 10.8 g. (0.05 mole) of N-acetyl-1-phenol-4-sulfonamide dissolved in 100 ml. of 0.5 N sodium hydroxide (0.05 mole) are dropped in simultaneously and independently 8.0 g. (0.05 mole) of O,O-dimethylphosphorochloridothioate and 50 ml. of a 1.0 N sodium hydroxide solution to maintain the pH above 9.5. The mixture is stirred at room temperature for 5.25 hours and the separated solids filtered off to give 7.2 g. (42%) of material with melting point 142–143°, soluble in base, insoluble in water or concentrated acid. The material is recrystallized from 150 ml. of toluene, and a second time from 100 ml. of toluene to give 6.8 g. (40%) of the product as light tan crystals with melting point of 142.0°–144° C.

*Example 3.—Preparation of O,O-dimethyl O-4-(acetylsulfamoyl)phenyl phosphorothioate*

10.8 g. (0.05 mole) of N-acetyl-1-phenol-4-sulfonamide is suspended in 100 ml. of water and the pH adjusted to 11.0 with 1.0 N sodium hydroxide. To this homogeneous solution is added 12.0 g. (0.075 mole, 50% excess) of O,O-dimethylphosphorochloridothioate and the pH of the vigorously stirred reaction mixture maintained at 11.0 by titration with 1.0 N caustic. Base consumption ceases after about one hour. Total base consumption indicates hydrolysis of 0.0346 mole of phosphorochloridothioate and formation of product to the extent of 77%, based on starting phenol. The reaction mixture pH is adjusted slowly to 1.5 with concentrated hydrochloric acid, the crystalline product collected, washed with water, and dried. Yield 11.0 g. (70%) of white crystals with melting point 142°–144° C.

Extraction of the acidified aqueous layer with methyl isobutyl ketone and purification of the residue gives 2.5 g. (23%) of recovered, pure starting phenol.

*Example 4.—Preparation of O,O-dimethyl O-4-(benzoylsulfamoyl)phenyl phosphorothioate*

The procedure of Example 3 is followed, substituting N-benzoyl-1-phenol-4-sulfonamide for the N-acetyl-1-phenol-4-sulfonamide and again employing a 50% excess of the phosphorochloridothioate. The relative insolubility of the sodium salt of the product necessitates starting the reaction with the phenol suspended in 400 ml. of water, on a 0.05 molar scale. In this reaction, the rate of the condensation is relatively slow with respect to the chloridothioate hydrolysis; thus, after two hours, base consumption indicates the hydrolysis of ⅔ of the total added chloridothioate. At this point additional chloridothioate is added, to bring the total added to 100% excess, and titration continued. The crude precipitate is extracted with chloroform to separate product from unreacted phenol. Evaporation of the solvent and recrystallization from toluene gives the pure product, with melting point 102°–104° C., in 63% yield.

*Example 5.—Preparation of O,O-dimethyl O-4-(acetylsulfamoyl)-3-methylphenyl phosphorothioate*

The procedure of Example 3 is followed, substituting the monohydrate of N-acetyl-1-phenol-3-methyl-4-sulfonamide for the N-acetyl-1-phenol-4-sulfonamide and again employing a 50% excess of the chloridothioate. Recrystallization of the crude precipitate from toluene and ether-acetone gives the pure product, with melting point 120°–121° C., in 62% yield.

*Example 6.—Preparation of O,O-dimethyl O-4-(isobutyrylsulfamoyl)phenyl phosphorothioate*

The procedure of Example 3 is followed, substituting the monohydrate of N-isobutyryl-1-phenol-4-sulfonamide for the N-acetyl-1-phenol-4-sulfonamide and also employing a 50% excess of the chloridothioate. Separation of unreacted phenol from product is difficult but is accomplished as follows: The crude material is extracted with ethylene dichloride, the residue consisting of essentially pure, recovered phenol. The solvent is removed from the extract and this residue recrystallized successively from toluene and carbon tetrachloride to give, ultimately, the pure, white crystalline product with melting point 103°–104.5° C. in 35% yield.

*Example 7.—Preparation of O,O-diethyl O-4-(chloroacetylsulfamoyl)phenyl phosphorothioate*

The procedure of Example 3 is used with the substitution of 12.6 g. (0.05 mole) of N-chloroacetyl-1-phenol-4-sulfonamide for N-acetyl-1-phenol-4-sulfonamide and of 10.4 g. (0.055 mole, 10% excess) of O,O-diethylphosphorochloridothioate for the O,O-dimethylphosphorochloridothioate. The product O,O-diethyl O-4-(chloroacetylsulfamoyl)phenyl phosphorothioate is obtained as a viscous oil.

*Example 8.—Preparation of diethyl 4-(acetylsulfamoyl)phenyl phosphate*

The procedure of Example 3 is followed with the exception that 17.3 g. (0.10 mole, 100% excess) of diethylphosphorochloridate is used in place of the O,O-dimethylphosphorochloridothioate. The product diethyl-4-(acetylsulfamoyl)phenol phosphate is obtained as a low-melting solid.

*Example 9.—Preparation of O,O-dimethyl O-4-(acetylsulfamoyl)-3-chlorophenyl phosphorothioate*

Following the procedure of Example 3 and substituting the N - acetyl - 1 - phenol - 3 - chloro - 4 - sulfonamide for the N-acetyl-1-phenol-4-sulfonamide and employing a 50% excess of the chloridothioate, the above-identified compound is prepared in crude form. This crude product is then recrystallized from toluene and ether-acetone mixture to produce O,O-dimethyl O-4-(acetylsulfamoyl)-3-chlorophenyl phosphorothioate in good yield and purity.

*Example 10.—Preparation of N-acetyl-1-phenol-3-methyl-4-sulfonamide, monohydrate*

A solution of 15 parts of 1-phenol-3-methyl-4-sulfonamide (U.S. Patent 2,694,724) in 25 parts of acetic anhydride is heated at 125° for seven hours. The solution is diluted with 100 ml. of water at 0° C., the precipitated oil phase extracted with ether and the solvent removed under reduced pressure. The residual oil is heated in 200 ml. of 2.5 N sodium hydroxide for 10 minutes. Cooling and acidification of the solution yields the crude material in 96% yield. Reprecipitation from basic solution yields the analytically pure monohydrate of N-acetyl-1-phenol-3-methyl-4-sulfonamide melting at 172°–173.5° C.

*Example 11.—Preparation of N-isobutyryl-1-phenol-4-sulfonamide, monohydrate*

21.3 g. of isobutyryl chloride is added to a solution of 17.3 g. of 1-phenol-4-sulfonamide (U.S. Patent 2,694,724) in 150 ml. of pyridine at 60° C. The mixture is heated for one hour at 90° C., brought to pH 8 with 25% sodium hydroxide and stirred an additional hour at 90° C. Acidification of the cooled solution precipitates the crude product. Reprecipitation from basic solution yields the pure monohydrate of N-isobutyryl-1-phenol-4-sulfonamide, melting at 198.5–199.5° C.

*Example 12.—Preparation of N-acetyl-1-phenol-3-chloro-4-sulfonamide*

Following the procedure of Example 10, a solution of 15 parts of 1-phenol-3-chloro-4-sulfonamide in 25 parts of acetic anhydride is heated at 125° C. for seven hours. The solution is diluted with 100 ml. of water at 0° C., the precipitated oil phase is extracted with ether and the solvent removed under reduced pressure. The residual oil is heated in 200 ml. of 2.5 N sodium hydroxide for 10 minutes, then cooled and acidified producing a crude product. The product is reprecipitated from a basic solution yielding N-acetyl-1-phenol-3-chloro-4-sulfonamide.

*Example 13.—Preparation of N-chloroacetyl-1-phenol-4-sulfonamide*

The procedure of Example 11 is followed using 22.6 g. of chloroacetyl chloride instead of isobutyryl chloride. Reprecipitation of the crude solid product from 2 N sodium hydroxide gives N-chloroacetyl-1-phenol-4-sufonamide.

We claim:
1. A compound of the formula:

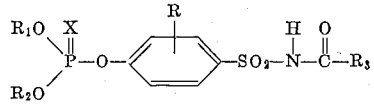

wherein $R_1$ and $R_2$ are lower alkyl, X is selected from the group consisting of sulfur and oxygen atoms, R is selected from the group consisting of hydrogen, chlorine and lower alkyl and $R_3$ is selected from the group consisting of phenyl, lower alkyl and chloro lower alkyl.

2. The compound O,O-dimethyl O-4-(acetylsulfamoyl)phenyl phosphorothioate.

3. The compound O,O - dimethyl O - 4 - (benzoylsulfamoyl)phenyl phosphorothioate.

4. The compound O,O - dimethyl O - 4 - (acetylsulfamoyl)-3-methylphenyl phosphorothioate.

5. The compound O,O - dimethyl O - 4 - (isobutyrylsulfamoyl)phenyl phosphorothioate.

6. The method of preparing a compound of the formula:

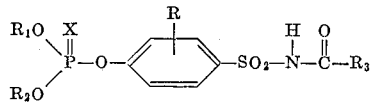

wherein $R_1$ and $R_2$ are lower alkyl, X is selected from the group consisting of sulfur and oxygen atoms, R is selected from the group consisting of hydrogen, chlorine and lower alkyl and $R_3$ is selected from the group consisting of phenyl, lower alikyl and chloro lower alkyl which comprises reacting a member selected from the group consisting of di-lower alkyl phosphorochloridothioates and di-lower alkyl phosphorochloridates with an N-acyl phenolsulfonamide wherein the acyl is selected from the group consisting of phenylcarbonyl, lower alkylcarbonyl and chloro lower alkyl carbonyl in an inert, polar solvent at a temperature of from about 0° C. to 100° C. and in the presence of an alkali metal hydroxide and maintaining the pH of said mixture at a value between about 9.5 and about 12 during the reaction.

7. A method of preparing O,O-dimethyl O-4-(acetylsulfamoyl)phenyl phosphorothioate which comprises reacting N-acetyl-1-phenol-4-sulfonamide with O,O-dimethylphosphorochloridothioate in a solvent having a pH from about 9.5 to about 12.

References Cited by the Examiner

UNITED STATES PATENTS

| | | | |
|---|---|---|---|
| 2,611,729 | 9/1952 | Bartlett et al. | 167—30 |
| 2,911,431 | 11/1959 | Orloff et al. | 260—461 |
| 2,954,318 | 9/1960 | Ludvik | 167—30 |
| 3,004,054 | 10/1961 | Smithey | 260—973 |
| 3,005,002 | 10/1961 | Berkelhammer | 260—461 |
| 3,005,004 | 10/1961 | Berkelhammer | 260—973 X |
| 3,087,855 | 4/1963 | Coull | 260—973 |

CHARLES B, PARKER, *Primary Examiner.*

IRVING MARCUS, *Examiner.*

F. M. SIKORA, BERNARD BILLIAN,
*Assistant Examiners.*